(12) United States Patent
Polegato Moretti et al.

(10) Patent No.: US 11,324,278 B2
(45) Date of Patent: May 10, 2022

(54) SHOE WITH UPPER AT LEAST PARTIALLY RENDERED IMPERMEABLE

(71) Applicant: GEOX S.P.A., Montebelluna (IT)

(72) Inventors: Mario Polegato Moretti, Crocetta del Montello (IT); Livio Poloni, Caerano di San Marco (IT)

(73) Assignee: GEOX S.P.A., Montebelluna (IT)

( * ) Notice: Subject to any disclaimer, the term of this patent is extended or adjusted under 35 U.S.C. 154(b) by 237 days.

(21) Appl. No.: 16/607,624

(22) PCT Filed: Apr. 24, 2018

(86) PCT No.: PCT/EP2018/060480
§ 371 (c)(1),
(2) Date: Oct. 23, 2019

(87) PCT Pub. No.: WO2018/197494
PCT Pub. Date: Nov. 1, 2018

(65) Prior Publication Data
US 2020/0046064 A1    Feb. 13, 2020

(30) Foreign Application Priority Data

Apr. 24, 2017 (IT) .................. 102017000044532

(51) Int. Cl.
*A43B 7/08* (2022.01)
*A43B 7/12* (2006.01)
(Continued)

(52) U.S. Cl.
CPC .............. *A43B 7/125* (2013.01); *A43B 7/087* (2013.01); *A43B 9/18* (2013.01); *A43B 23/022* (2013.01); *B29D 35/061* (2013.01); *B29D 35/142* (2013.01)

(58) Field of Classification Search
CPC ......... A43B 7/081; A43B 7/088; A43B 7/087; A43B 23/022
(Continued)

(56) References Cited

U.S. PATENT DOCUMENTS

2002/0040537 A1    4/2002    Polegato Moretti
2005/0055843 A1    3/2005    Morlacchi
(Continued)

FOREIGN PATENT DOCUMENTS

CN        2847914 Y      12/2006
DE      195 47 276 A1     6/1997
(Continued)

OTHER PUBLICATIONS

Combined Chinese Office Action and Search Report dated Jan. 6, 2021 in corresponding Chinese Patent Application No. 201880027273.1 (with English Translation and English Translation of Category of Cited Documents), 12 pages.
(Continued)

*Primary Examiner* — Timothy K Trieu
(74) *Attorney, Agent, or Firm* — Oblon, McClelland, Maier & Neustadt, L.L.P.

(57) ABSTRACT

A shoe with an upper that is at least partially rendered impermeable, including a sole; an insole; an upper assembly, which at least comprises a breathable lining, a breathable upper, and, interposed between at least part thereof, a layer that is waterproof and is fixed hermetically below the insole, the upper assembly being associated with the insole; and a region providing a waterproof seal of the insole to the sole, the sealing region substantially surrounding the breathable or perforated portion that is free for perspiration.

19 Claims, 7 Drawing Sheets

(51) Int. Cl.
  *A43B 9/18*   (2006.01)
  *A43B 23/02*  (2006.01)
  *B29D 35/06*  (2010.01)
  *B29D 35/14*  (2010.01)

(58) Field of Classification Search
  USPC .................................................. 36/3 B, 3 R
  See application file for complete search history.

(56) References Cited

U.S. PATENT DOCUMENTS

| | | | |
|---|---|---|---|
| 2009/0199438 A1* | 8/2009 | Polegato Moretti | ........................ B29D 35/142 36/3 B |
| 2012/0030885 A1* | 2/2012 | Moretti | .................... A43D 8/34 12/145 |
| 2012/0055042 A1* | 3/2012 | Polegato Moretti | ... A43B 7/125 36/83 |
| 2012/0151806 A1* | 6/2012 | Polegato Moretti | ........................ B29D 35/142 36/3 B |
| 2013/0152430 A1* | 6/2013 | Bier | ........................ A43B 7/06 36/3 A |
| 2013/0247414 A1* | 9/2013 | Bier | .................... A43B 23/0235 36/45 |
| 2017/0188660 A1 | 7/2017 | Polegato Moretti et al. | |

FOREIGN PATENT DOCUMENTS

| | | |
|---|---|---|
| EP | 1 197 158 A1 | 4/2002 |
| EP | 2 238 850 A1 | 10/2010 |
| EP | 2 298 100 A1 | 3/2011 |
| WO | WO 03/079839 A1 | 10/2003 |
| WO | WO 2016/005570 A1 | 1/2016 |

OTHER PUBLICATIONS

International Search Report dated Jul. 6, 2018 in PCT/EP2018/060480 filed Apr. 24, 2018.

Italian Search Report dated Dec. 18, 2017 in Patent Application No. 2017000044532 filed Apr. 24, 2017.

\* cited by examiner

SHOE WITH UPPER AT LEAST PARTIALLY RENDERED IMPERMEABLE

This application is a United States national stage application of International Application No. PCT/EP2018/060480, filed Apr. 24, 2018, which designates the United States, and claims priority to Italian Patent Application No. 102017000044532, filed Apr. 24, 2017, and the entire contents of each of the above applications are hereby incorporated herein by reference in entirety.

BACKGROUND OF THE INVENTION

The present invention relates to a shoe with an impermeable and breathable sole and an upper that is at least partially rendered impermeable.

In particular, the present invention relates to a shoe with an impermeable and breathable sole and an upper which is water-resistant with a characteristic of impermeableness up to a certain height from the ground.

DESCRIPTION OF THE RELATED ART

It is known that the comfort of a shoe is linked not only to correct anatomical fit but also to correct outward perspiration of the water vapor that has formed inside the shoe itself due to sweating.

As is known, furthermore, the part of the foot that has the greatest perspiration effect is the sole, where the generated sweat saturates the air with humidity and mostly condenses, stagnating on the plantar insert.

It is known that evacuation of sweat in the vapor phase can be achieved for example by means of shoes with different types of soles made of rubber which are impermeable to water in the liquid state and permeable to water vapor and are rendered such by means of the use of a membrane that is arranged so as to provide an impermeable seal as an insert in a sole with through openings (EP0382904, EP0858270, WO2004028284, WO2006010578, WO2007147421, WO2010000617).

The manufacturing method commonly known as AGO lasting has already long been known in the shoemaking field and provides, with an operation known as pulling over, to fold the lower edges of the outer layer of the upper and of the lining, termed lasting margins, below an insole, so as to be interposed partially between said insole and the sole, and to glue them perimetrically to said insole.

The sole is then joined by adhesive bonding ("lasting") or direct injection in the mold.

AGO lasting is generally used for shoes of the classic and elegant type.

The operation for pulling over the outer layer of the upper and of the lining on the insole allows to achieve a more pleasant appearance of the upper assembly and a better value, since the upper is extended directly onto the last so as to adhere perfectly thereto and to assume its shape exactly. The more the shoes are elegant, the more they need to be pulled on the last.

Moreover, the insole must be structured and made of a material that is rigid enough to allow the pulling over operation, performed with an adapted machine known as pulling over machine.

On the other hand, although the upper has a composite lining, which comprises at least one outer layer constituted by a membrane that is impermeable to water in the liquid state and permeable to water vapor, and by a breathable internal lining, which is directed toward the foot insertion region, and although said membrane is therefore interleaved entirely between the outer layer of the upper and the inner lining, then there is a substantially total lack of waterproofing. Classic AGO lasting in fact allows penetration of the water toward the inside of the shoe through the outer layer of the upper and through the insole.

In the manufacture of these shoes it is important to pay attention to the sealing of the joining regions between the insole, the lining with membrane, the outer layer of the upper and the sole, in order to avoid even the slightest seepage of water from the outside.

Fully impermeable and breathable shoes have been known for some time. For example, EP2238850B1 and EP2238851B1 use a first gasket joined to the lower surface of the assembly insole so as to seal in an impermeable manner the membrane of the upper assembly, and a second gasket which straddles the first gasket and the lasting margins of the upper, forming a region providing an impermeable seal of the upper assembly and of the first gasket to the sole.

One alternative is provided by WO2012072379, wherein an assembly insole made of impermeable material is joined to the membrane of the upper assembly, forming an impermeable seal and likewise providing a region of impermeable seal between said assembly insole and the sole, simplifying the construction of the shoe since the second gasket is eliminated.

Constructions with an upper that is entirely impermeable and breathable, however, are generally expensive, since they add to the cost of the leather or of the fabric that is normally used also the cost of an impermeable and breathable membrane for an extension at least equal to the extension of the upper.

These constructions require a more complex process which adds for example the steps of coupling the impermeable and breathable membrane to the leather or to the fabric of the upper, in addition to a certain attention for example in the pulling over operations, when the fastening clamps of the pulling over machine must be flattened, i.e., must have no clamping teeth or knurlings which might damage the membrane of the upper assembly and for the same reason the adhesive used necessarily must be of the polymeric type instead of the traditional thermoplastic type.

Moreover, the impermeable and breathable membranes normally coupled to leather and fabrics have a low thickness in order to avoid compromising the softness of the upper and privilege permeability to water vapor, and therefore are membranes with a limited mechanical resistance, with a consequent risk of rupture which can occur over the entire extension of the upper.

Furthermore, the membrane, while being permeable to water vapor, reduces the permeability of the upper assembly when it has an extension at least equal to that of the upper. The membrane is in fact in any case in a barrier element which, despite being breathable, leads to a reduction in the inherent vapor permeability of the materials of the upper and of the lining.

Furthermore, the use of shoes with an entirely impermeable and breathable upper may not always turn out to be necessary, or even superfluous, for example if the user uses them in a predominantly urban environment.

BRIEF SUMMARY OF THE INVENTION

The aim of the present invention is to provide a shoe with an upper that is at least partially rendered impermeable, which is capable of improving the background art in one or more of the aspects indicated above.

Within this aim, an object of the invention is to provide a shoe that is simultaneously capable of protecting the foot that wears it in case of immersion in a few centimeters of water and at the same time can be provided more simply and cheaply than the mentioned shoes of the known type.

Another object of the invention is to provide a shoe that can be more breathable at least at certain parts of the upper with respect to the mentioned known shoes.

This aim, as well as these and other objects which will become better apparent hereinafter are achieved by a shoe with an upper that is at least partially rendered impermeable according to claim 1, optionally provided with one or more of the characteristics of the dependent claims.

BRIEF DESCRIPTION OF THE SEVERAL VIEWS OF THE DRAWINGS

Further characteristics and advantages of the invention will become better apparent from the description of three preferred but not exclusive embodiments of the shoe with an upper that is at least partially rendered impermeable according to the invention, illustrated by way of nonlimiting example in the accompanying drawings, wherein.

DETAILED DESCRIPTION OF THE INVENTION

Figure 1:
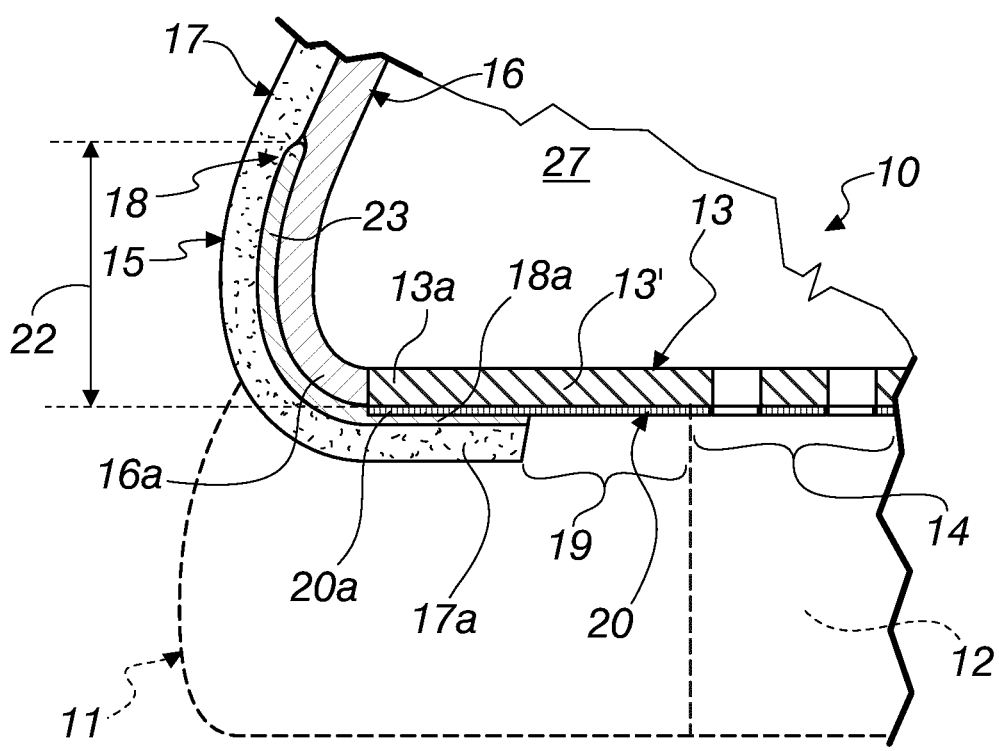
FIG. 1 is a view of a portion of a transverse cross-section of a shoe according to the invention in a first embodiment thereof.

With reference to the figures, the shoe according to the invention, designated generally by the reference numeral 10 in its first embodiment, comprises:

a sole 11, provided with a perspiration region 12, an insole 13, which has at least part of its lower surface made of impermeable material, provided with at least one breathable or perforated portion 14 above said perspiration region 12, which, when assembled, it covers, an upper assembly 15 which at least comprises a breathable lining 16, a breathable upper 17, and, interposed between at least part of them, a layer 18 that is waterproof and is fixed hermetically below the insole 13; the upper assembly 15 is associated with the insole 13; in particular, the upper assembly 15 is associated with the insole 13 according to the construction known as AGO lasting;

a region 19 providing a waterproof seal of the insole 13 to the sole 11, the sealing region 19 substantially surrounding the breathable or perforated portion 14 which is free for perspiration.

Advantageously, the sole 11 can have a perspiration region 12.

Conveniently, the insole 13 has at least part of its own lower surface made of impermeable material, provided with at least one breathable or perforated portion 14 above said perspiration region 12, which, when assembled, it covers.

The insole 13 comprises, directed toward the sole 11, at least one first gasket 20 made of a waterproof material, which has at least one breathable or perforated portion 14 above the perspiration region 12 of the sole 11, below which the lower edges 17a and 18a respectively of the breathable upper 17 and of the impermeable layer 18 are folded.

Figure 2:
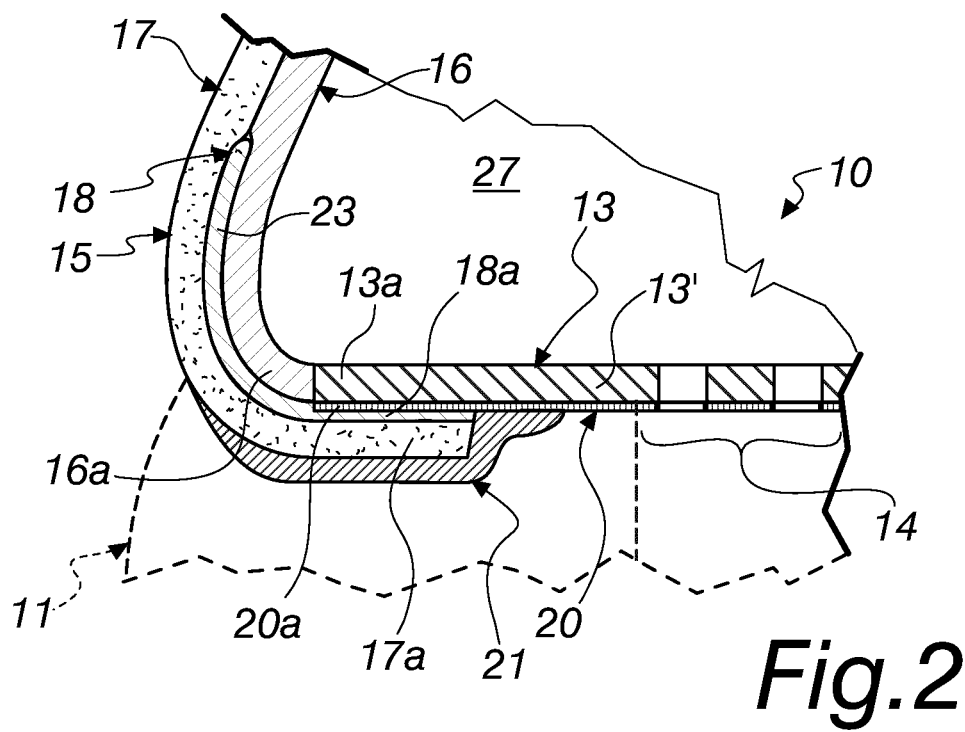
FIG. 2 is a view of a portion of a transverse cross-section of a shoe according to the invention in a variation of the first embodiment.

Advantageously, in a first variation of this first embodiment, shown in FIG. 2, there is at least one second gasket 21 made of a waterproof material, which is arranged below the lower edge 17a of the upper 17, affecting at least perimetrically the perspiration region 12 of the sole 11 and the breathable or perforated portion 14 of the first gasket 20, and sealed in an impermeable manner at least to the first gasket 20.

In the first embodiment of FIG. 1, the upper assembly 15, which wraps around the foot insertion region 27, comprises an upper 17 made of a material that is breathable and preferably water resistant, and a breathable or perforated lining 16, preferably made of leather or breathable fabric.

In the present invention, an element is understood to be waterproof if the absence of crossing points is observed when it is subjected to a pressure of at least 1 bar maintained for at least 30 seconds.

More particularly, impermeableness is assessed as resistance of the specimen to the penetration of water under pressure according to the EN1734-1998 standard. A sample of material is fixed so as to close a vessel provided with an inlet for pressurized water. The vessel is filled with water so as to subject the face of the sample of material directed into the container to a hydrostatic pressure of 1.0 bars. This condition is maintained for 30 seconds. The sample is blocked between the inlet of the vessel and a retention ring, both being covered with sealing gaskets made of silicone rubber. Pressurization is obtained by forcing into the vessel water that arrives from a tank by means of a flow of compressed air. The compressed air is regulated by an air valve with a pressure gauge on which the pressure reached is displayed.

The face of the the sample that is external to the vessel is observed. The absence of crossing points, which consist in the forming on said surface of drops with a diameter between 1 mm and 1.5 mm, indicates the impermeableness of the sample.

If necessary to avoid the deformation of the sample, a grid with a square mesh with a side of no more than 30 mm, made of synthetic material and provided with filaments with a diameter of 1 mm to 1.2 mm, is fixed thereon.

Hereinafter, unless where otherwise specified, the term "impermeable" is understood to mean "waterproof".

Hereinafter, the expressions "vapor-permeable" and "breathable" are used alternately, both with the same meaning.

Vapor permeability or breathability is determined according to the method presented in chapter 6.6 of the ISO 20344-2004 standard. The ISO 20344-2004 standard, in chapter 6.6 "Determination of water vapour permeability", related to safety shoes, describes a testing method which consists in fixing a specimen of the material being tested so as to close the opening of a bottle which contains a certain quantity of solid desiccant, i.e., silica gel. The bottle is subjected to a strong current of air in a conditioned atmosphere. The bottle is rotated so as to stir the solid desiccant and optimize its action of drying the air contained in the bottle. The bottle is weighed before and after the testing period in order to determine the mass of humidity that has passed through the material and has been absorbed by the solid desiccant.

Permeability to water vapor, expressed in milligrams per square centimeter per hour [$mg/cm^2/h$], is then calculated on the basis of the mass of humidity measured, of the area of the opening of the bottle, and of the testing time.

The expression "water-resistant element" is understood to reference an element that does not exhibit water crossing after at least 8000 flexing cycles, evaluated according to the method presented in the ASTM D2099-05 standard. According to this standard, at least two specimens are necessary which are taken appropriately and conditioned, then inserted in the instrument, bending them in the dorsal direction with the side whose dynamic water resistance is to be tested directed downward, fixing them to clamps by means of adapted wedge-shaped blocks. 135±5 g of stainless steel balls are poured into the trough thus formed. A tank is filled with a solution of NaCl (1 g/L) in which the specimens are immersed to a distance of 2 cm from the lowest point of the specimen that is adjacent to the fixing clamp. An electrode is inserted in the trough, in contact with the stainless steel balls, while the saline solution constitutes the other electrode. The instrument subjects the specimens to flexing cycles and stops as soon as a dispersion of current occurs which indicates the crossing of the water along the thickness of material. Water absorption is calculated, on the average of the two specimens, as (A−B)/B*100, where A is the weight of the specimen at the end of the test, once the surface drops have been dried, and B is the initial weight of the specimen.

The impermeable layer 18 is advantageously in the form of a film or tape of thermoplastic hot melt adhesive, of the type of those commercially available (for example the 3218 film marketed by the company Bemis Associates Inc., or XAF 36.004 Puro of the company Collano AG, or the heat-sealing double-adhesive polyurethane film termed STX200 of the company Seatex, or also the PRX 1733/A film of the company FaitPlast).

In a first embodiment, the impermeable layer 18 is not permeable to water vapor, the lack of contribution to perspiration from the impermeable layer 18 is in fact negligible on the whole.

The use of a layer that is waterproof and not permeable to water vapor is advantageous since it allows to use impermeable materials that are much cheaper and resistant than impermeable and breathable ones, and to speed up the production process.

Impermeable and breathable materials, for example membranes made of expanded polytetrafluoroethylene, ePTFE, or polyurethane, PU, are constituted in fact by thin layers with a low resistance to mechanical stresses and must therefore be handled with care.

The impermeable layer 18 is interposed between the upper 17 and the lining 16 and can be advantageously coupled alternatively to one element or the other according to the requirements.

In a constructive variation, therefore, the impermeable layer 18 is coupled to the lining 16.

In a different constructive variation, the impermeable layer 18 is coupled to the upper 17.

In turn, the impermeable layer 18 is composed of a layer of adhesive which is advantageously of the polyurethane type and by a layer of a material that is waterproof, for example polyurethane.

The layer of adhesive adheres to the upper or to the lining, while the layer made of waterproof material is oriented in the opposite direction, so as to avoid unintentionally sticking to the components used during the operations for providing the upper assembly 15.

In a particularly preferred embodiment thereof, the impermeable layer 18 comprises a layer of polyurethane adhesive which has a thickness of approximately 50 microns, while the layer of impermeable material made of polyurethane has a thickness of approximately 150 microns, for a total thickness of the impermeable layer 18 of approximately 200 microns.

Conveniently, the layer of polyurethane adhesive has a lower melting point than the layer of polyurethane.

In a particularly preferred type of impermeable layer 18, the layer of polyurethane adhesive has a melting point between 115 and 145° C., while the layer of polyurethane has a melting point between 175 and 190° C.; this allows to thermally activate the adhesive without damaging the polyurethane layer.

In the first embodiment of the invention, the impermeable layer 18 is associated internally with the upper 17.

The impermeable layer 18 is glued to the upper 17.

The impermeable layer 18 is extended between the upper 17 and the lining 16 until it forms a band 23 with a height 22 that is preferably of 20-60 mm.

In particular, in this constructive example, the impermeable layer 18 is extended so as to affect the entire edge 17a of the upper 17 and then between the upper 17 and the lining 16 until it forms a band 23 with a height 22 of preferably 20-60 mm, more preferably 30-50 mm and particularly 35 mm.

The portion of impermeable layer 18 that is not comprised in the band 23 has an extension of approximately 15 mm.

The height 22 is to be understood as measured in a direction that is perpendicular to a resting surface of the shoe 10, between the lower surface of the insole 13 and the upper end of the impermeable layer 18, as shown in FIG. 1.

In particular, the band 23 measures a height of 50 mm, or 45 mm, or 40 mm in the case of shoes respectively for men, women or children; this value is to be understood as expressed on the basic size (for example in the French size scale, respectively size 42, 37 or 27), increasing or decreasing according to the grading of the upper.

Conveniently, the upper 17 is obtained by joining together portions of upper, for example by adhesive bonding and/or sewing, which is followed by the adhesive bonding of the impermeable layer 18.

As an alternative, the impermeable layer 18 is glued onto each portion of upper before the portions are joined; in this case, the joints between the portions of upper are appropriately sealed in a waterproof manner, for example by means of impermeable tapes which surmount the flaps of each portion of upper and are arranged so as to straddle contiguous flaps of each portion.

In a constructive variation, which is termed "two-dimensional", the upper 17 is almost completely assembled, for example it is not sewn in the heel region, so that it can be extended over a flat surface.

As an alternative, in a constructive variation which can be termed "three-dimensional", a folded and closed upper 17 is prepared, and an impermeable layer 18 is shaped and sewn so as to substantially copy the shape of the upper 17.

For example, the impermeable layer 18 is formed by two portions which are sewn at the four ends or by a single portion which is folded and sewn at the two matching ends.

The impermeable layer 18 is wrapped around the upper 17.

The three-dimensional solution is constituted in this case also by a substantially two-dimensional adhesion, by fitting the assembly on a flat shape, which is constituted by a rigid material and by an external surface part constituted by a resilient material (i.e., capable of regaining its original shape).

Advantageously, a shank can be inserted in the insole 13 or in the sole 11.

The insole 13 comprises a portion 13' made of a material that is breathable, for example mesh fabric, fabric, leather, or perforated material, and a first gasket 20 made of waterproof material joined to the lower surface of the portion 13'.

The first gasket 20 is conveniently made of a material that is impermeable to water in the liquid state, but it has a portion 14 that is breathable or perforated, since it is permeable to water vapor or perforated, at least at the perspiration region 12 of the sole 11.

The first gasket 20 is preferably provided like the impermeable layer 18, i.e., it is composed of a multilayer film comprising a layer of adhesive, advantageously of the polyurethane type, and of a layer of waterproof material, for example polyurethane.

As an alternative, the first gasket 20 is made of any other equivalent capable of ensuring an effective seal, for example ethylene vinyl acetate (EVA).

The first gasket 20 is conveniently joined directly to the lower surface of the portion 13', before the construction of the upper assembly 15.

If the first gasket 20 is made of multilayer film, the latter comprises conveniently two layers of adhesive, advantageously of the polyurethane type, which have a lower melting point and between which a layer of waterproof material, for example polyurethane, which has a higher melting point, is interposed.

The first layer of adhesive facilitates adhesive bonding to the portion 13' that is breathable, while the second layer of adhesive facilitates adhesive bonding to the sole 11.

As an alternative, the first gasket 20 is constituted by an impermeable and breathable membrane, for example made of expanded polytetrafluoroethylene (E-PTFE) material, or polyurethane (PU), or the like, optionally associated with at least one mesh.

The breathable or perforated portion 14 of the first gasket 20 is extended along the entire surface of the insole 13 if the perspiration region 12 is extended along the entire longitudinal direction of the sole 11, or advantageously constitutes only one or more localized portions of the first gasket 20, if the perspiration region 12 is limited only to delimited regions of the sole 11.

The first gasket 20, which is associated with the portion 13', forms the bottom of the upper assembly 15 and simultaneously performs the function of a constructive element for closing the upper and of impermeable sealing element.

The lower edge 17a of the upper 17 and the lower edge 18a of the impermeable layer 18 are joined, substantially flush, folded and glued so as to provide an impermeable seal, according to the construction known as AGO lasting, below the perimetric region 20a of the first gasket 20.

Conveniently, the lasting margin composed of the lower edge 18a and of the lower edge 17a joined together protrudes from the lower flap of the lining 16a by 10-15 mm.

The operation for pulling over said lasting margin, which consists in folding and gluing, below the perimetric edge 20a of the first gasket 20, the lower edge 18a the lower edge 17a joined together, according to the construction known as AGO lasting, is conveniently performed with an instrument known as "pulling over machine".

The joining so as to provide an impermeable seal between the impermeable layer 18 of the upper assembly 15 and the first gasket 20 is provided by means of an adhesive that is commonly used for pulling over, such as adhesive of the thermoplastic, polyurethane or neoprene type.

The shoe 10 is provided by associating with the upper assembly 15, constituted by the upper 17, by the impermeable layer 18, by the lining 16 and by the insole 13, the sole 11, so as to provide an impermeable seal in a manner that prevents infiltrations of water that arrives from the surface of contact with the ground up to the height from the ground reached by the impermeable layer 18 inside the foot insertion region 27.

This association can occur by adhesive bonding or overmolding.

The sole 11 is sealed in a waterproof manner to the upper assembly 15 at the sealing region 19, which conveniently is extended at least for the part of the insole 13 that is free from the lower edge 18a and does not affect the breathable or perforated portion 14.

Preferably, the connection with an impermeable seal between the sole 11 and the first gasket 20 is direct and occurs by gripping the material that constitutes the sole 11 on the insole 13, or by adhesive bonding.

Advantageously, the second gasket 21 is arranged below the upper 17 and at least perimetrically with respect to the breathable or perforated portion 14 of the first gasket 20, and is sealed in a manner that is waterproof at least to the first gasket 20 before connection to the sole 11 occurs.

The second gasket 21 is conveniently made of a material that is impermeable to water in the liquid state and is sealed for at least 5-6 mm on the first gasket 20; the second gasket 21 surmounts and straddles the lower edge 17a of the upper 17 and of the first gasket 20, so as to be in direct contact both with the lower edge of the upper 17a and with the first gasket 20.

The second gasket 21 extends the area of impermeable seal also to the lower edge 17a of the upper 17 and stops infiltrations of any water absorbed by the material of the upper 17.

In this manner it is possible to avoid the stagnation of water between the insole 13 and the sole 11 and its entrainment into the upper assembly 15 by the breathable or perforated portion 14 that is present in the first gasket 20.

The second gasket 21 surrounds the breathable or perforated portion 14 of the first gasket 20 and the perspiration region 12 of the sole 11, without affecting them; as an alternative, the second gasket 21 is appropriately perforated at the perspiration region 12, so as to avoid compromising the very logic of perspiration.

Conveniently, in fact, the edge of the perspiration region 12 of the sole 11 is internal to the second gasket 21 to allow the sealing of the second gasket 21 with the sole 11 and the adhesive bonding of the upper 17 with the sole 11.

The second gasket 21 is constituted by a film or a tape of thermoplastic hot-melt adhesive, as described above for the first gasket 20.

This type of adhesive generally constituted by polyurethane, polyester, polyamide or polyolefins is activated by means of heat and pressure.

Said film, exposed to heat and subjected to pressing, softens and penetrates within the substrates that must be sealed, in particular filling the channels created, in particular in the region of the lasting heel and of the toe of the shoe, by the wrinkles of the lasting margin composed of the lower edge 18a of the impermeable layer 18 and of the lower edge 17a of the upper 17 joined together, which otherwise can convey any water absorbed by the upper 17 to the insole 13.

Furthermore, by extending the impermeable sealing area also to the lower edge 17a of the upper 17, the second gasket 21 compensates for the irregularity of the sealing region 19, which, influenced by the tension of the clamps used in the pulling over operation, might in some points be too reduced due to a scarcely precise pulling over.

By cooling, furthermore, the second gasket 21 establishes an adhesive bonding of the mechanical and chemical type with the substrates and regains its original strength.

In this manner, the impermeable area that is useful for the subsequent sealing of the sole 11 is enlarged with respect to the sealing region 19, since it also comprises the adhesive bonding area of the sole 11, and facilitates its adhesive bonding to the upper assembly 15.

In this manner, in fact, the lower edge 17a of the upper 17 becomes impermeable and therefore can be sealed in a manner that is waterproof: said type of seal can in fact be provided only between materials that are waterproof.

This allows the impermeable sealing of the sole 11 to be performed also on the surface of the lower edge 17a of the upper 17 and not only on the first gasket 20.

It is evident that said useful area for the sealing of the sole 11 and of the lower edge of the upper assembly 15 must necessarily be an area of impermeable sealing with a perimetric extension which surrounds the perspiration region 12 of the sole 11 and the breathable or perforated portion 14 of the first gasket 20.

By virtue of these technical solutions, the shoe 10 according to the invention is waterproof up to the height from the ground reached by the impermeable layer 18; considering that as a consequence of the AGO lasting approximately 15 mm of the impermeable layer 18 are folded below the insole 13, the shoe is impermeable up to a height 22 of preferably 20-60 mm, more preferably 30-50 mm, and particularly 35 mm, above the lower surface of the insole 13.

A breathable cleaning insole, optionally removable, not shown for the sake of simplicity and to be understood as being of a known type, completes the shoe 10.

In a particularly preferred constructive variation, the portion 13' of the insole 13 is constituted by a mesh fabric and the breathable or perforated portion 14 of the first gasket 20 is constituted by a single opening at the sole the foot.

Figure 3:
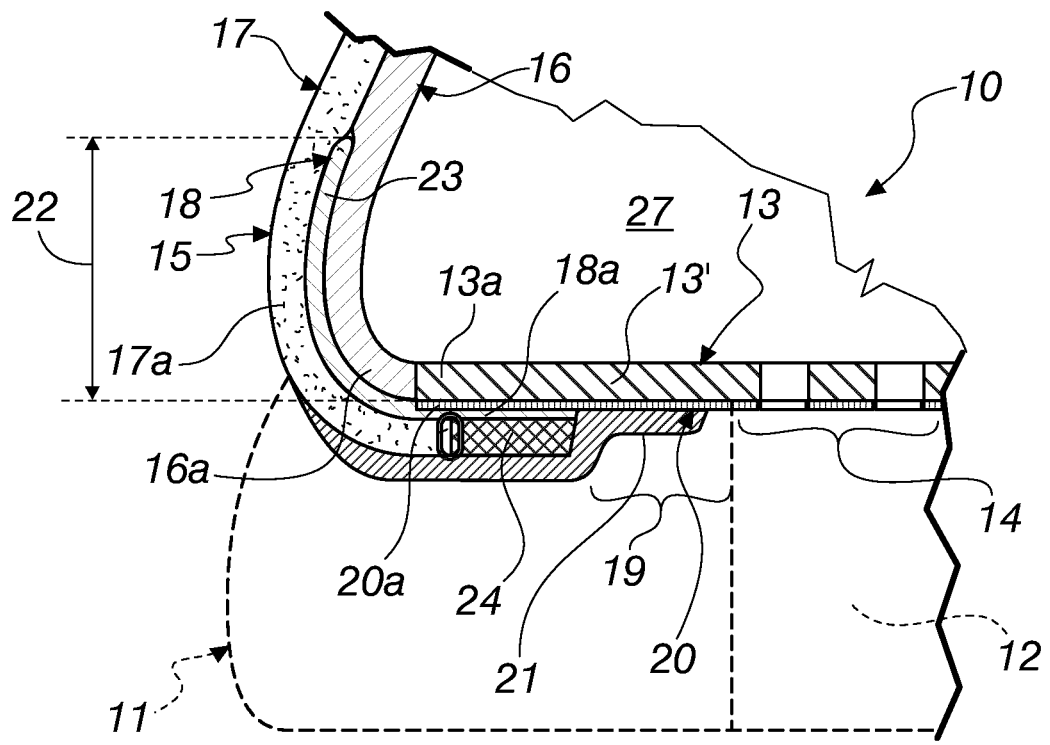
FIG. 3 is a view of a portion of a transverse cross-section of a shoe according to the invention in a second variation of the first embodiment.

FIG. 3 shows a constructive variation of the first embodiment of the shoe 10 according to the invention; in this variation, the upper assembly 15 wraps around the foot insertion region 27 and comprises an upper 17, which is breathable and preferably water resistant, and a lining 16, which is breathable or perforated and is preferably made of leather or breathable fabric.

The upper assembly 15 comprises an impermeable layer 18, as described above, associated inside the upper 17, for example by means of thermoadhesive glue, which advantageously is already comprised in the layer 18.

The layer 18 is glued to the upper 17 and in particular is extended along the entire lower edge 17a of the upper 17 and then between the upper 17 and the lining 16 until it forms a band 23 with a height 22 of preferably 20-60 mm, more preferably 30-50 mm, and particularly 35 mm, which is adjacent to the lower flap section 16a of the lining itself.

Prior to this association, a sealing element 24, preferably with a width of 8-12 mm, is joined approximately flush to the lower edge 17a of the upper 17 for example by zigzag sewing.

The impermeable layer 18 is applied after the joining between the external layer of the upper 17 and the sealing element 24, so as to render impermeable the point of contiguity between the two different materials.

The upper assembly 15 further comprises an insole 13, which is breathable or perforated at least at the perspiration region 12 of the sole 11.

The insole 13 comprises a portion 13' made of a material that is breathable, for example mesh fabric, fabric, leather, or perforated, and a first gasket 20 which is joined to the lower surface of the portion 13'.

The first gasket 20, like the preceding solutions, is conveniently made of a material that is impermeable to water in the liquid state, while it has a portion 14 which is breathable or perforated, since it is permeable to water vapor or perforated, at least at the perspiration region 12 of the sole 11.

The lower edge 18a of the impermeable layer 18 and the sealing element 24 are conveniently folded and glued so as to provide an impermeable seal below the first gasket 20, associated with the portion 13', for example according to the construction known as AGO lasting.

Conveniently, the lasting margin composed of the lower edge 18a of the impermeable layer 18 and of the sealing element 24 joined together protrudes from the lower flap of the lining 16a by 10-15 mm.

Conveniently, the sealing element 24 is made of a mesh of synthetic material, mesh fabric, shuttle-loomed fabric or three-dimensional fabric, which allows the passage of sealing materials in the case of a glued sole or the passage of the polymeric material of the sole in the case of direct injection.

Preferably, the sealing element 24 is constituted by a monofilament material, so as to not entrain water.

As an alternative, the sealing element 24 can be made of a thermoadhesive impermeable material, such as a tape of thermoplastic hot-melt adhesive capable of melting and sealing the impermeable layer 18.

Another function of the sealing element 24, conveniently made of a material that is lighter and thinner than the upper 17, is to reduce the forming of the creases that are created as a consequence of the operation for lasting the toe and the heel of the upper 17 on the first gasket 20, which is associated with the portion 13'. These creases in fact constitute true channels for water infiltration.

The joining with an impermeable seal between the impermeable layer 18 of the upper assembly 15 and the first gasket 20 occurs conveniently by means of the use of adhesive commonly used for pulling over, such as adhesive of the thermoplastic, polyurethane or neoprene type.

Advantageously, a second gasket 21 is arranged below the upper 17 and below the sealing element 24 and at least perimetrically with respect to the breathable or perforated portion 14 of the first gasket 20, and is sealed in a manner that is waterproof at least to the first gasket 20, before connection to the sole 11 occurs.

The second gasket 21 is substantially similar to the ones used in the preceding embodiments and allows to achieve the same advantages.

Furthermore, the second gasket 21 directly seals the impermeable layer 18 by passing through the sealing element 24 or fusing with it.

In this manner, the adhesive bonding margin of the upper assembly 15 is less thick and does not require carding, since the edge of the upper 17 is close to the last edge.

The second gasket 21 extends the impermeable sealing area also to the sealing element 24 and stops infiltrations of any water that might have been absorbed by the material of the upper 17. In this manner it is possible to avoid the stagnation of the water between the insole 13 and the sole 11 and its entrainment inside the upper assembly 15 in the part of the breathable or perforated region 14, which is present in the first gasket 20.

Figure 4:
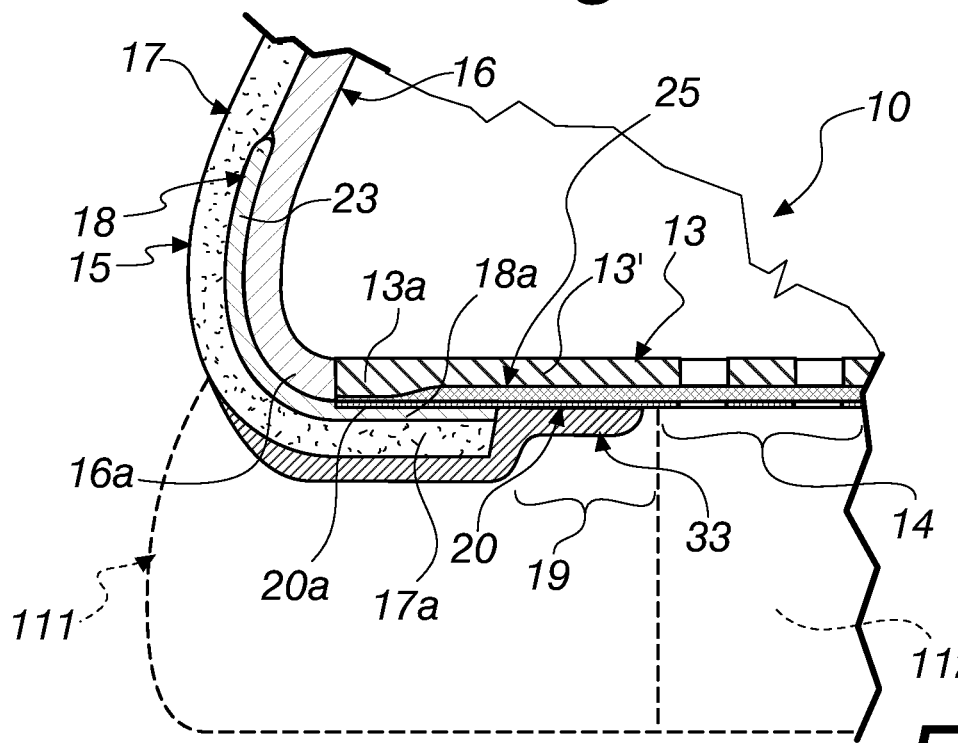
FIG. 4 is a view of a portion of a transverse cross-section of a shoe according to the invention in a third variation of the first embodiment.

FIG. 4 shows a further variation of the first embodiment of the shoe 10 according to the invention; in this variation, the upper assembly 15 wraps around the foot insertion region.

The upper assembly 15 comprises an insole 13, which is breathable or perforated at least at the perspiration region 12 of the sole 11.

The insole 13 comprises a portion 13' made of a material that is breathable, for example mesh, fabric, leather, or perforated, and a first gasket 20 joined to the lower surface of the portion 13'. The first gasket 20, in a manner similar to the solutions described above, is conveniently made of a material that is impermeable to water in the liquid state, while it has a portion 14 which is breathable or perforated, since it is permeable to water vapor or perforated, at least at the perspiration region 12 of the sole 11.

In this variation, prior to this association, a waterproof and breathable membrane 25 is sealed to the first gasket 20, for example by adhesive bonding to provide a perimetric impermeable seal, and is optionally associated with at least one mesh, at the breathable or perforated portion 14 of the first gasket 20.

In this manner, it is possible to eliminate any membrane that is present in the sole 11, since the entry of water "from below" is prevented by the membrane 25.

A protective layer for the impermeable and breathable membrane 25, arranged at the holes of the tread, made of a material that is resistant to hydrolysis, water repellent and breathable, allows to protect the membrane 25 against any external impacts or foreign objects that might penetrate through the openings of the sole 11.

Figure 5:
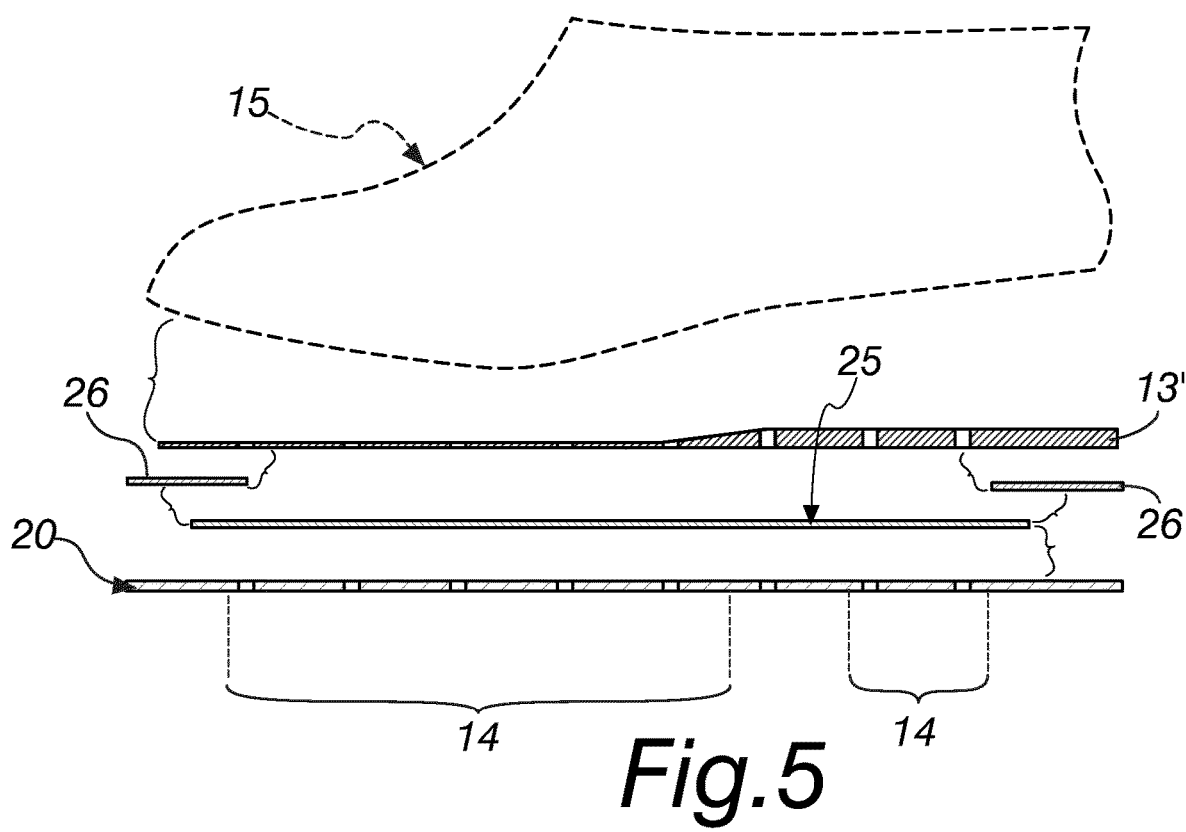
FIG. 5 is a view of a portion of a transverse cross-section of a shoe according to the invention in a fourth different variation of the first embodiment.

A further variation of the first embodiment of the shoe 10 according to the invention is shown in FIG. 5.

The first gasket 20, conveniently made of impermeable material, such as for example extruded polyurethane (PU) or ethylene vinyl acetate (EVA), which is breathable or perforated, at least in a breathable or perforated portion 14 arranged at the perspiration region 12 of the sole 11, is joined by adhesive bonding to the portion 13' made of a cellulose-like material, such as a Texon, which is appropriately reinforced in a lower region with a shank made of leather, or plastic material or metal for greater support and torsion resistance of the shoe.

In this case also, the portion 13' and any shank are breathable or perforated at least at the perspiration region 12 of the sole 11.

An impermeable and breathable membrane 25, which is similar to the ones mentioned earlier, for example made of expanded polytetrafluoroethylene (e-PTFE), polyurethane (PU), or the like, optionally associated with at least one mesh, is advantageously glued in an impermeable manner to the first gasket 20 at the breathable or perforated portion 14.

Advantageously, a film 26 of thermoplastic hot-melt adhesive of the type of the ones described previously is arranged in an upper region so as to affect the edges of the membrane 25 and of the first gasket 20. In this manner said impermeable adhesive bonding is improved.

The first gasket 20, associated with the portion 13', defines the bottom of the upper assembly 15 and simultaneously performs the functions of constructive element for closing the upper 17 and of impermeable sealing element.

The use of a film 26 of thermoplastic hot-melt adhesive to seal perimetrically "from above" the membrane 25 to the first gasket 20 allows to simplify and speed up the production process of the shoe with respect to the use of a seal by perimetric adhesive bonding "from below" with normal adhesive of the polyurethane type.

In fact, in the case of a seal "from below" it is necessary first of all to treat the membrane 25 and the first gasket 20 with the polyurethane adhesive and it is then necessary to wait for the correct drying period, 10 to 20 minutes, before reactivating the polyurethane adhesive and pressing the elements in order to promote their adhesion.

Instead, in the case of a seal "from above" it is possible to glue the film of thermoplastic hot-melt adhesive to the membrane 25 and onto the first gasket 20 with fresh polyurethane adhesive and then hot press the elements in order to promote their adhesion, saving the drying time of the polyurethane adhesive.

Figure 6:
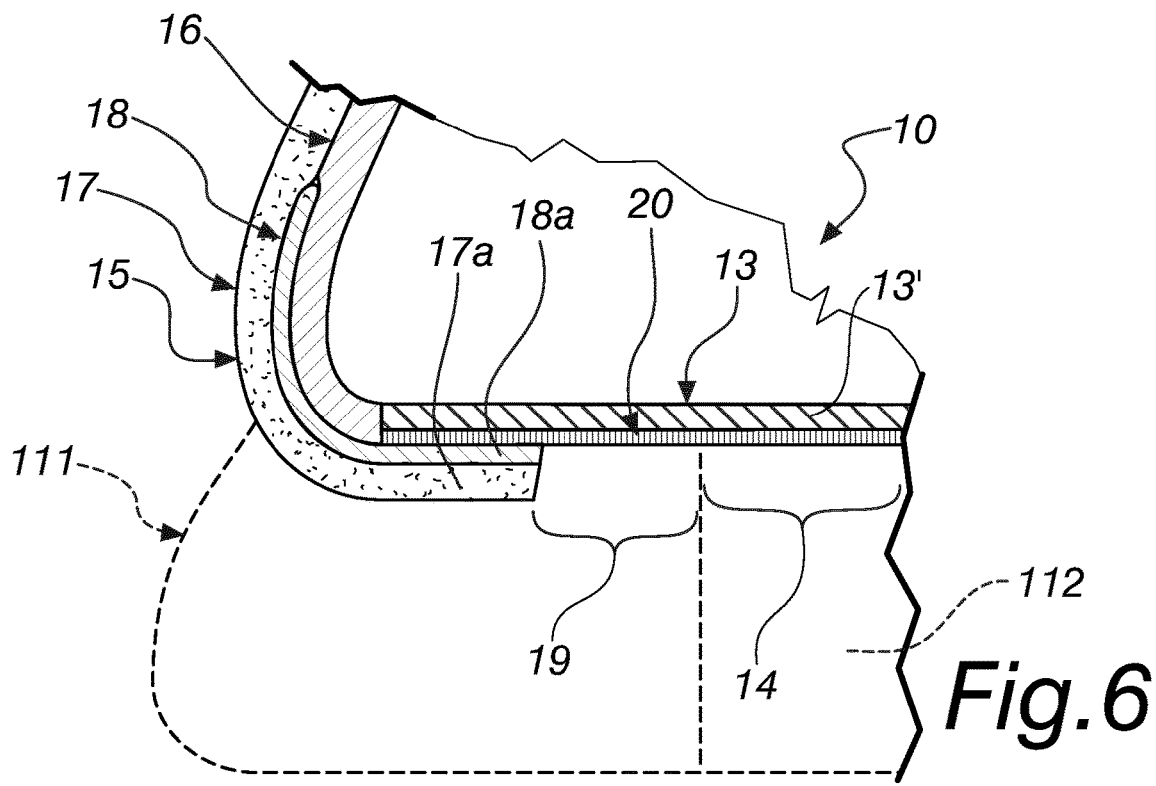
FIG. 6 is a view of a portion of a transverse cross-section of a shoe according to the invention in a fifth variation of the first embodiment.

FIG. 6 shows a further variation of the first embodiment of the invention.

In this variation of the shoe 10, the upper assembly 15, which wraps around the foot insertion region, comprises an insole 13, which is breathable or perforated at least at the perspiration region 112 of the sole 111.

The insole 13 comprises a portion 13' made of a material that is permeable to vapor, for example mesh fabric, fabric, leather, or perforated, and a first gasket 20 which is joined to the lower surface of the portion 13'.

The first gasket 20 is conveniently constituted by an impermeable and breathable membrane, similar to the ones cited previously, and therefore has a breathable portion 14 at least at the perspiration region 112 of the sole 111.

In particular, the use of this solution becomes advantageous if the perspiration region 112 is extended over the entire longitudinal direction of the sole 111.

Like in the preceding variation, it is possible to eliminate the membrane that is present in the sole 111, since entry of water "from below" is prevented by the first gasket 20.

A protective layer for the first gasket 20, which is impermeable and breathable, arranged at the holes of the tread and made of a material that is resistant to hydrolysis, water-repellent, breathable or perforated, allows to protect the first gasket 20 against any external impacts or foreign objects which might penetrate through the openings of the sole 111.

Figure 7:
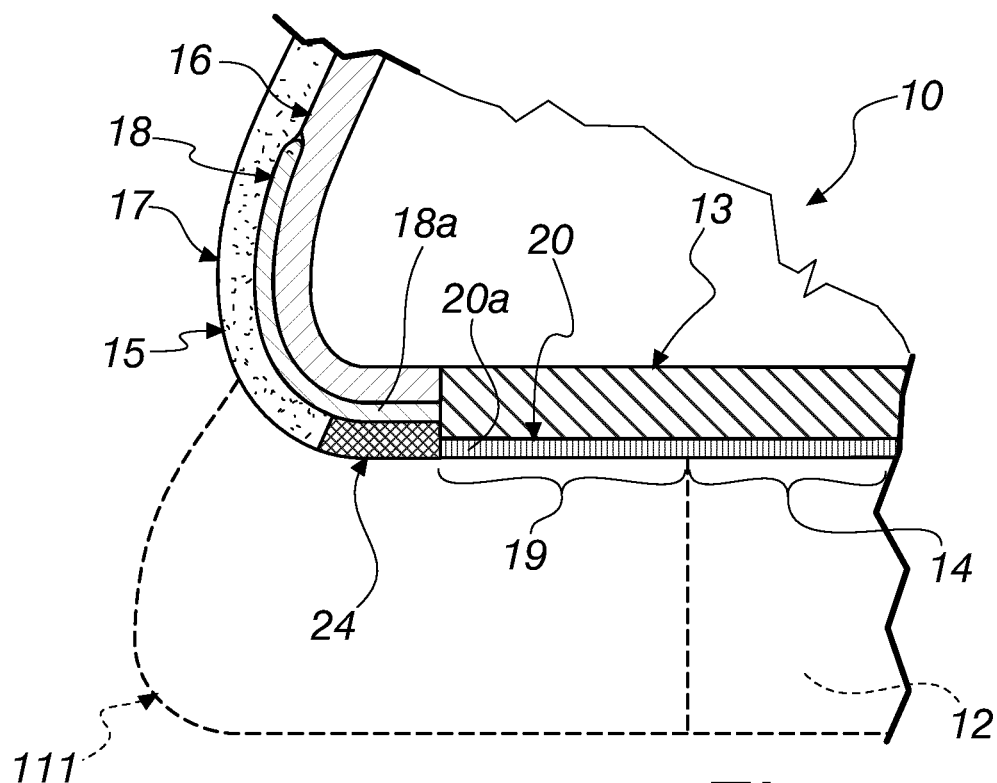
FIG. 7 is a view of a portion of a transverse cross-section of a shoe according to the invention in a sixth variation of the first embodiment.

FIG. 7 shows another variation of the first embodiment of the shoe 10 according to the invention.

In this variation, the upper assembly 15 wraps around the foot insertion region.

The upper 17 ends toward the insole 13 with a sealing element 24 which is covered at least partially by the lower edge 18a of the impermeable layer 18, said sealing element 24 and said lower edge 18a being associated with a perimetric margin of the insole 13 by means of a stitched seam.

There is a mutual impermeable seal, described hereinafter, between the impermeable layer 18, at the sealing element 24, and the first gasket 20, the latter being conveniently constituted by an impermeable and breathable membrane, which is similar to the ones cited previously, and which therefore has a breathable portion 14 at least at the perspiration region 112 of the sole 111.

There is in fact sealing material which is gripped so as to form an impermeable seal to the perimetric region 20a of the first gasket 20 and cooperates with the sealing element 24 to provide a mutual impermeable seal between the lower edge 18a of the impermeable layer 18 and the perimetric region 20a of the first gasket 20.

Advantageously, the sealing material is the material of the sole 111, which is provided by direct injection on the upper assembly 15 by virtue of known methods.

Figure 11:
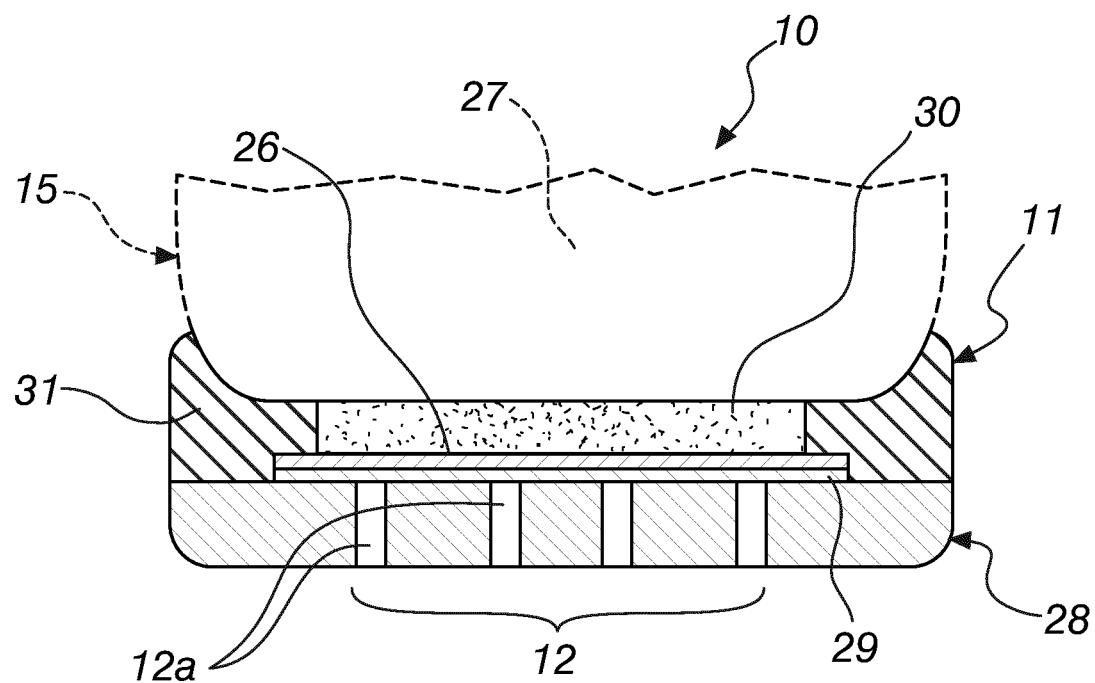
FIGS. 11 to 13 are each a transverse sectional view of a different sole of a shoe according to the invention.
Figure 12:
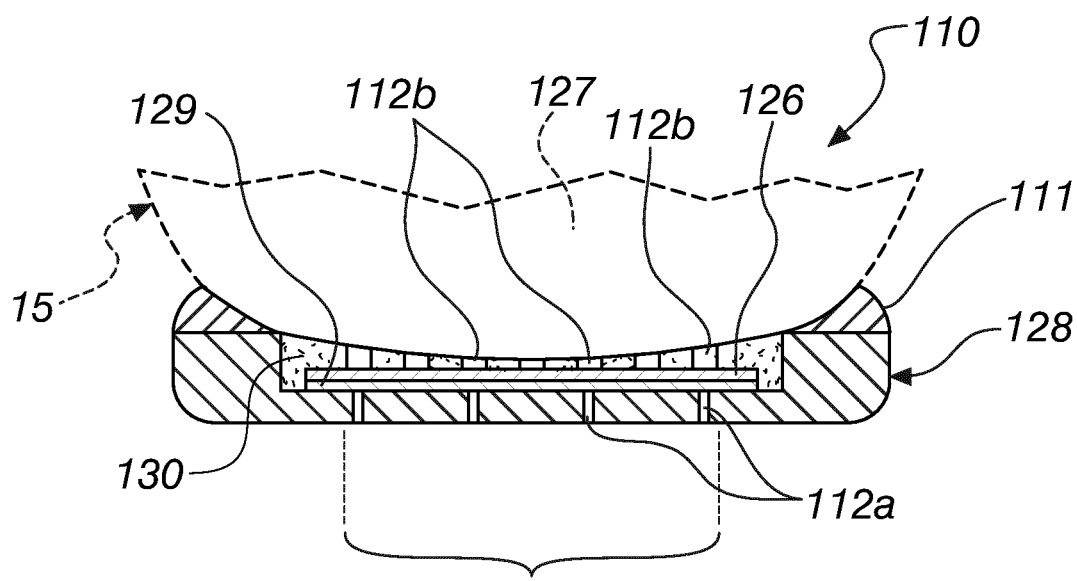
Figure 13:
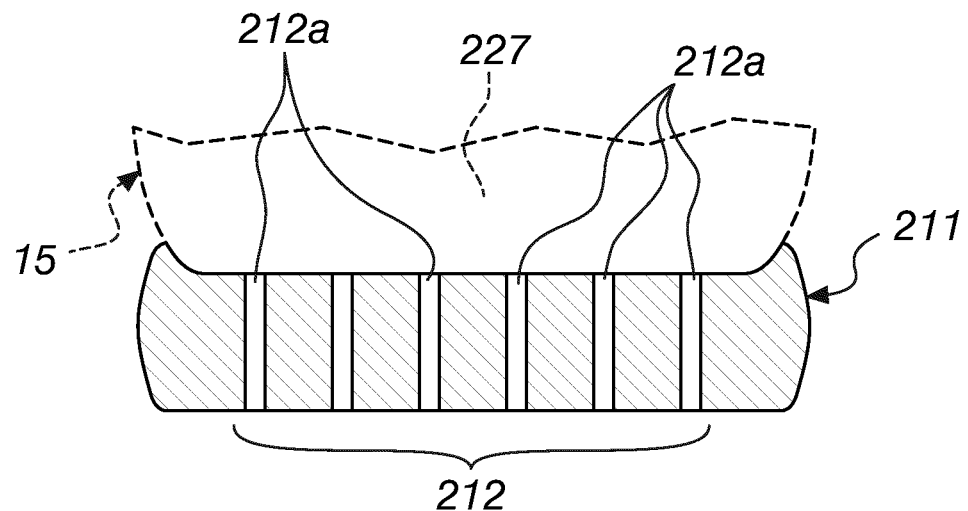

FIGS. 11, 12 and 13 show some examples of a sole 11, 111 and 211 made of impermeable material and provided with at least one perspiration region 12, 112 and 212 respectively.

The sole 11, 111, 211 is to be understood as being of a per se known type, and its embodiments cited here are described in previous patents in the name of this same Applicant.

Each one of said soles is of the type comprising a tread with through openings in at least one region thereof, above which optionally a protective element and a membrane of the type that is impermeable to water in the liquid state and permeable to water vapor are arranged so as to provide a perspiration region 12, 112, 212.

With reference to FIGS. 11 and 12, the sole 11 and 111 is provided with one or more wide openings or with a plurality of holes 12a and 112a which face the breathable or perforated portion 14 of the insole 13, and are covered, so as to form a seal that is waterproof, by an impermeable and breathable insert 26 and 126, in order to allow the evacuation of water vapor that arrives from the foot insertion region 27 while preventing the rise of liquids toward it.

In particular, in a first one of said embodiments, of FIG. 11, the sole 11 comprises
  a lower body 28, tread, which at the perspiration region 12 is provided with through holes or openings 12a, covered by a protective layer 29, which is advantageously resistant to hydrolysis, water repellent, breathable or perforated,
  an impermeable and breathable insert 26, which is superimposed on the protective layer 29, in order to be protected thereby against impacts and penetrations through the holes or openings 12a,
  a spacer element 30, which is breathable or perforated, for example made of felt or similar material, superimposed on the impermeable and breathable insert 26,
  a mid-sole 31, which surrounds the spacer element 30, is connected to the lower body 28 and is sealed to the impermeable and breathable insert 26.

In the second embodiment of the sole 111 of FIG. 12, the spacer element 130 is also perforated with through holes 112b, with an impermeable and breathable insert 126 superimposed on the protective layer 129, which are interposed between the holes or openings 112a of the perspiration region 112 of the lower body 128, and the through holes 112b of the spacer element 130.

The method for providing the sole 11, in said first embodiment, consists in
  molding the lower body 28,
  arranging the lower body 28 in the mold of the mid-sole 31,
  superimposing the protective layer 29 on the lower body 28, at the perspiration region 12,
  superimposing the impermeable and breathable insert 26 on the protective layer 29,
  superimposing the spacer element 30 on the impermeable and breathable insert 26,
  injecting the mid-sole 31 so as to form an annular element which surrounds the spacer element 30, as a perimetric impermeable seal of the impermeable and breathable insert 26.

With reference to FIG. 13, the presence of an impermeable and breathable insert in the sole is not necessary in the embodiments that already have a membrane or a first gasket made of impermeable and breathable material in the upper assembly 15, as in the constructive variations of FIGS. 4, 5, 6 and 7: in this case, it is sufficient to provide a sole 211 provided with one or more perspiration regions 212 which preferably have one or more wide openings or a plurality of free holes 212a which pass through its thickness to allow the evacuation of water vapor that arrives from the foot insertion region 227.

Figure 14:
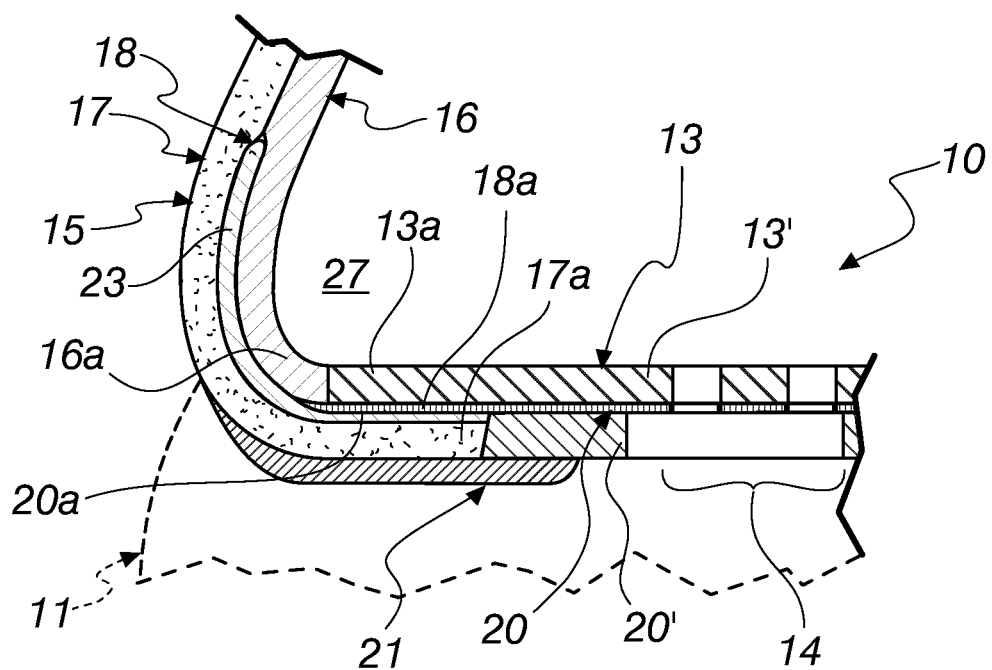
FIG. 14 is a view of a portion of a transverse cross-section of a further variation of the first embodiment of a shoe according to the invention.

FIG. 14 shows a further variation of the first embodiment of a shoe according to the invention, in which the first gasket 20 protrudes from the portion 13', for example in order to increase the contact surface with the impermeable layer 18, improving the coupling with an impermeable hermetic sealing between the impermeable layer 18 and the first gasket 20.

Advantageously, the first gasket 20 is thicker at the breathable or perforated region 14 so as to compensate the thickness of the upper in the upper assembly 15. In a manner that is substantially equivalent and alternative, the first gasket 20 comprises a layer 20' made of impermeable, breathable or perforated material, which is extended at the perforated region 14 up to the lower edge 18a and 17a.

Figure 8:
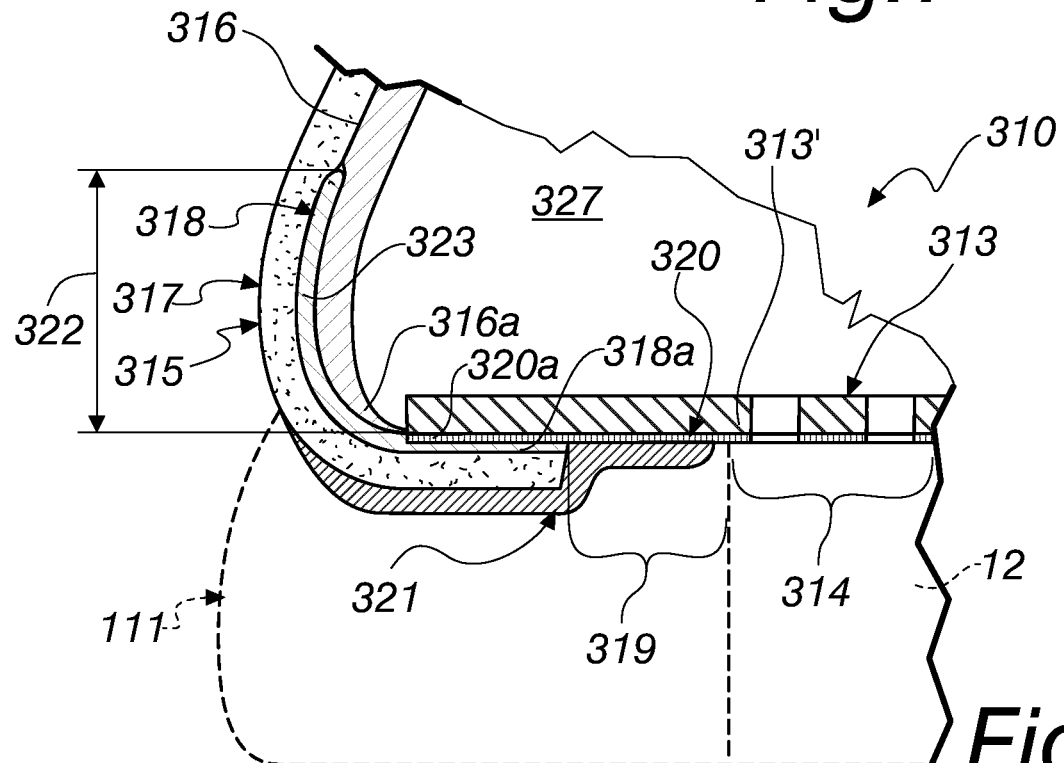
FIG. 8 is a view of a portion of a transverse cross-section of a shoe according to the invention in a second embodiment thereof.

FIG. 8 shows a second embodiment of a shoe according to the invention, generally designated therein by the reference numeral 310.

The shoe 310 is provided with an upper assembly 315 which wraps around the foot insertion region 327 and comprises an upper 317, which is breathable and preferably water resistant, and a breathable or perforated lining 316, which is preferably made of leather or breathable fabric.

In the construction of the upper assembly 315 there is an impermeable layer 318, which is similar to the impermeable layer 18 described above for the first embodiment and its variations.

The layer 318 is glued to the lining 316, instead of to the upper, and in particular is extended along the entire lower flap 316a of the lining 316 and is extended so as to form a band 323 with a height 322 preferably of 20-60 mm, more preferably 30-50 mm, and particularly 35 mm, which is adjacent to the lower flap 316a of said lining.

The lining 316 conveniently is obtained by joining together lining portions, for example by adhesive bonding and/or sewing, followed by the gluing of the impermeable layer 318. As an alternative, the impermeable layer 318 is glued onto each lining portion before the portions are joined. In this case, the joints between the lining portions are conveniently sealed in a waterproof manner for example by means of impermeable tapes which surmount the flaps of each lining portion and straddle contiguous flaps of each portion.

The upper assembly 315 further comprises an insole 313, which is breathable or perforated at least at the perspiration region 12 of the sole 11.

The insole 313 comprises a portion 313' made of a material that is permeable to vapor, for example mesh fabric, fabric, leather, or perforated, and a first gasket 320 which is joined to the lower surface of the portion 313'.

The first gasket 320, in a manner similar to the preceding solution, is conveniently made of a material that is impermeable to water in the liquid state, and has a portion 314 which is breathable or perforated, since it is permeable to water vapor or perforated, at least at the perspiration region 12 of the sole 11.

In a variation in which the perspiration region 12 is extended along the entire longitudinal direction of the sole 11, the breathable or perforated portion 314 of the first gasket 320 is extended along the entire surface of the insole 313.

In a variation in which the perspiration region 12 is limited only to delimited regions of the sole 11, the breathable or perforated portion 314 constitutes only one or more localized portions of the first gasket 320.

The first gasket 320, associated with the lower surface of the portion 313', forms the bottom of the upper assembly 315 and simultaneously performs the functionalities of constructive element for closing the upper and of waterproof sealing element.

In this second embodiment of the invention, advantageously the lower flap 316a of the lining 316 and the lower edge 318a of the layer 318 are joined substantially flush, folded and glued so as to provide an impermeable seal, according to the construction known as AGO lasting, under the perimetric edge 320a of the first gasket 320 associated with the portion 313'.

Advantageously, the lower edge 318a of the impermeable layer 318 protrudes from the lower flap 316a of the lining 316 by 10-15 mm so as to expose the lower edge 318a in order to facilitate the water-impermeable sealing of the impermeable layer 318 to the first gasket 320; in this case, the dimensions of the film that composes the impermeable layer 318 are increased by the same extent in order to keep unchanged the distance from the edge of the last.

If the lower flap 316a of the lining is joined to the lining 316, for example by sewing, and is obtained starting from a laminated element which also comprises the advantageously breathable impermeable layer 318, then the lower flapper 316a of the lining 316 is skived so as to expose the lower edge 318a.

The skiving operation consists in thinning the margin of the material of the internal lining, for example performed with an instrument known as a skiving machine of the "Fortuna 4" type.

The first gasket 320 can advantageously protrude from the portion 313', for example in order to increase the surface of contact with the impermeable layer 318, improving the impermeable seal coupling between the impermeable layer 318 and the first gasket 320.

Advantageously, the first gasket 320 is thicker at the breathable or perforated region 314 so as to compensate for the thickness of the upper in the upper assembly 315.

The operation for pulling over the lower flap 316a of the lining 316 and of the lower edge 318a of the impermeable layer 318 is conveniently performed with an instrument known as pulling over machine.

The impermeable sealing coupling between the layer 318 and the first gasket 320 occurs conveniently by using adhesive commonly used for pulling over, such as adhesive of the thermoplastic, polyurethane or neoprene type.

The upper 317 is therefore mounted above the lower edge 318a of the impermeable layer 318, with a second pulling over operation, again conveniently by using adhesive commonly used for pulling over.

The shoe 310 is provided by associating with the upper assembly 315 the sole 11, so as to form an impermeable seal so as to prevent infiltrations of water that arrives from the surface of contact with the ground up to the height from the ground reached by the impermeable layer 318 inside the foot insertion region 327. This association can occur by adhesive bonding or overmolding.

The sole 11 is sealed in an impermeable manner to the upper assembly 315 at the sealing region 319, which conveniently is extended for the part of the insole 313 that is free from the lower edge 318a and does not affect the breathable or perforated portion 314.

Preferably, the impermeable hermetic connection between the sole 11 and the first gasket 320 is direct and occurs by grip of the material that constitutes the sole 11 on the insole or by adhesive bonding.

As an alternative, a second gasket 321 is arranged below the upper 317 and at least perimetrically with respect to the breathable or perforated region 314 of the first gasket 320 and is sealed in a waterproof manner at least to the first gasket 320 before connection to the sole 11 occurs.

The second gasket 321 is substantially similar to the ones used in the preceding embodiments and allows to achieve the same advantages.

Figure 9:
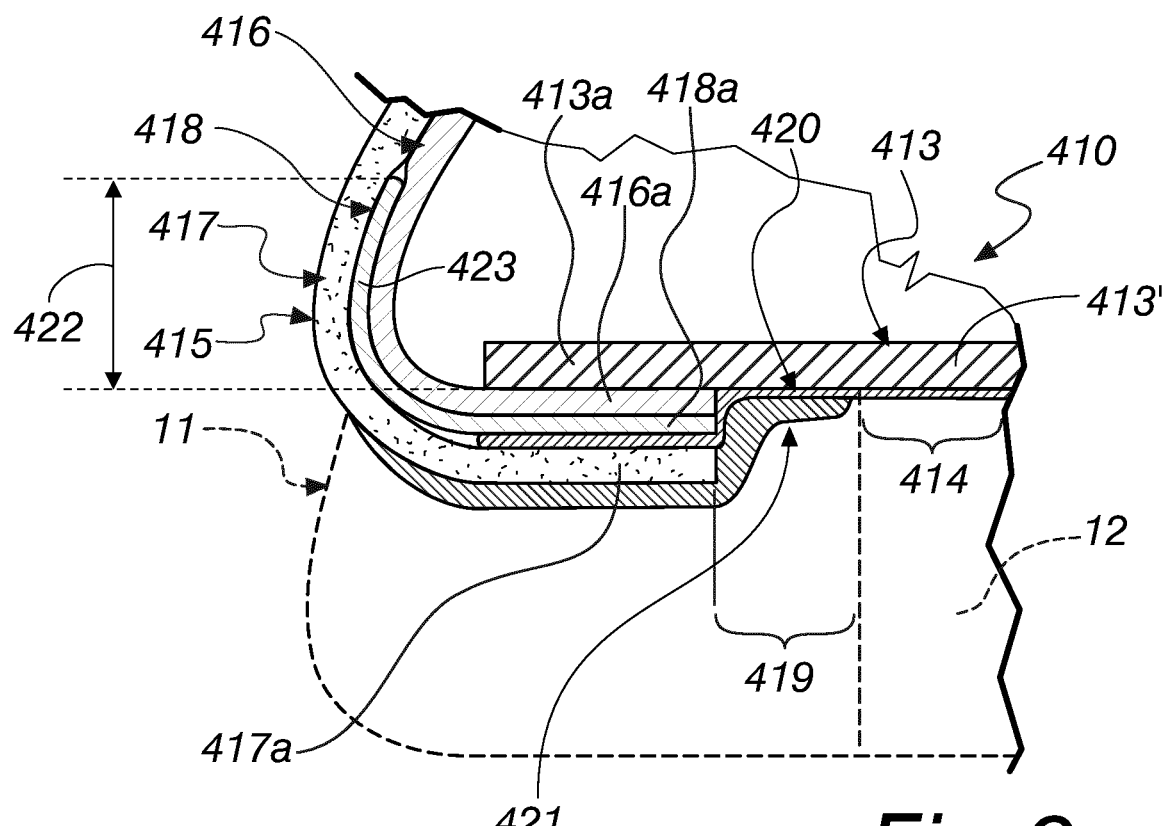
FIG. 9 is a view of a portion of a transverse cross-section of a shoe according to the invention in a third embodiment thereof.

FIG. 9 shows a third embodiment of a shoe according to the invention, designated therein generally by the reference numeral 410.

The shoe 410 is provided with an upper assembly 415 which wraps around the foot insertion region and comprises an upper 417, which is breathable and preferably water-resistant, and a breathable or perforated lining 416, preferably made of leather or breathable fabric.

The upper assembly 415 comprises an impermeable layer 418 as described above for the other embodiments and constructive variations.

The impermeable layer 418 is glued to the lining 416 and in particular it is extended along the entire lower flap 416a of the lining 416 and is extended so as to form a band 423 with a height 422 preferably of 20-60 mm, more preferably 30-50 mm, and particularly 35 mm, which is adjacent to the lower flap 416a of the lining.

The lining 416 conveniently is obtained by joining together lining portions, for example by adhesive bonding and/or sewing, followed by the adhesive bonding of the impermeable layer 418. As an alternative, the impermeable layer 418 is glued onto each lining portion before the portions are joined. In this case, the joints between the lining portions are conveniently sealed in a waterproof manner for example by means of impermeable tapes which surmount the flaps of each lining portion and are arranged so as to straddle contiguous flaps of each portion.

The upper assembly 415 further comprises an insole 413, which is breathable or perforated at least at the perspiration region 12 of the sole 11.

The insole 413 comprises a portion 413' which is made of a material that is breathable, for example mesh fabric, fabric, leather, or perforated, and a first gasket 420 which is joined to the lower surface of the portion 413'.

Advantageously, the lower flap 416a of the lining 416 and the lower edge 418a of the impermeable layer 418 are joined substantially flush, folded and glued so as to provide an impermeable seal, according to the construction known as AGO lasting, below the perimetric edge 413a of the portion 413'.

The sole 11 is sealed in an impermeable manner to the upper assembly 415 at the sealing region 419.

In this embodiment, the first gasket 420 seals in an impermeable manner the lower edge 418a of the impermeable layer 418 from the lower part of the lower edge 418a.

The operation for pulling over the lower flap 416a of the lining 416 and the lower flap 418a of the impermeable layer 418 joined together is performed conveniently with an instrument known as pulling-over machine.

The adhesive bonding between the impermeable layer 418 and the portion 413' occurs conveniently by using adhesive commonly used for pulling over, such as adhesive of the thermoplastic, polyurethane or neoprene type.

As an alternative, the operation for pulling over the lining can occur manually with the aid of adapted clamps.

The first gasket 420, in a manner similar to the preceding solutions, is conveniently made of a material that is impermeable to water in the liquid state, while it has a portion 414 which is breathable or perforated, since it is permeable to water vapor or perforated, at least at the perspiration region 12 of the sole 11.

In a variation in which the perspiration region 12 is extended along the entire longitudinal direction of the sole 11, the breathable or perforated portion 414 of the first gasket 420 is extended along the entire surface of the insole 413.

In another variation in which the perspiration region 12 is limited only to delimited regions of the sole 11, the breathable or perforated portion 414 constitutes only one or more localized portions of the first gasket 420.

The joining so as to form an impermeable seal between the lower edge 418a of the impermeable layer 418 and the first gasket 420 conveniently occurs by using adhesive commonly used for pulling over, such as adhesive of the thermoplastic, polyurethane or neoprene type.

The upper 417 is thus mounted below, i.e., externally, with respect to the first gasket 420, i.e., the first gasket 420 is interposed between the lower edge 418a of the impermeable layer 418 and the lower edge 417a of the upper 417.

The upper 417 is mounted below the first gasket 420 with a second pulling over operation, always conveniently by using adhesive commonly used for pulling over.

Advantageously, a second gasket 421 is arranged below the upper 417 and at least perimetrically with respect to the breathable or perforated portion 414 of the first gasket 420 and is sealed in a waterproof manner at least to the first gasket 420 before connection to the sole 11 occurs.

The second gasket 421 is substantially similar to the ones used in the preceding embodiments and constructive variations and allows to obtain the same advantages.

Figure 10:
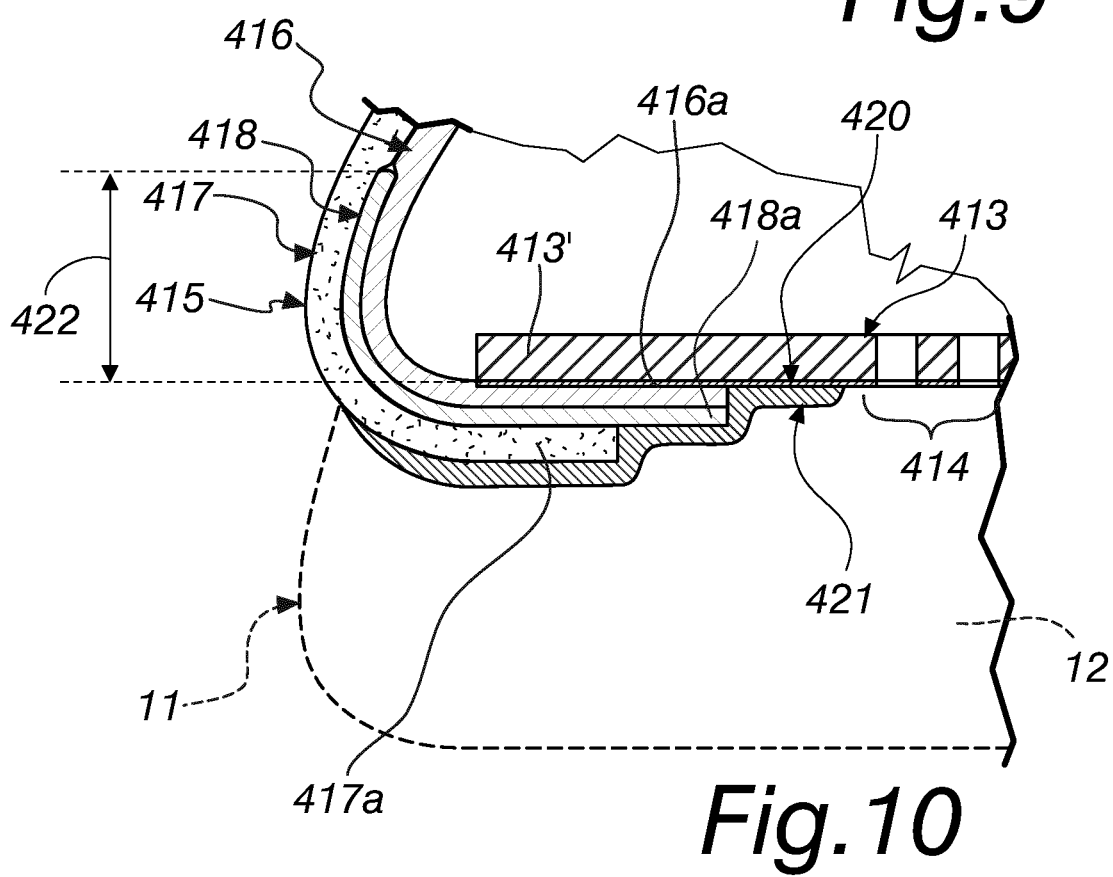
FIG. 10 is a view of a portion of a transverse cross-section of a shoe according to the invention in a variation of the third embodiment.

FIG. 10 shows a variation of the third embodiment of the shoe 410 according to the invention of FIG. 9.

In this variation, the upper assembly 415, according to a first alternative of the third embodiment of the invention, comprises an impermeable layer 418, which is similar to the one described for the preceding embodiments and constructive variations.

The layer 418 is glued to the lining 416 and in particular is extended along the entire lower flap 416a of the lining 416 and is extended so as to form a band 423 with a height 422 of preferably 20-60 mm, more preferably 30-50 mm, and particularly 35 mm, which is adjacent to the lower flap 416a of the lining.

The lining 416 conveniently is obtained by joining together lining portions for example by adhesive bonding and/or sewing, followed by adhesive bonding of the impermeable layer 418. As an alternative, the impermeable layer 418 is glued onto each lining portion before the portions are joined. In this case, the joints between the lining portions are conveniently sealed in a waterproof manner for example by means of impermeable tapes which surmount the flaps of each lining portion and straddle contiguous flaps of each portion.

The lower flap 416a of the lining 416 and the lower edge 418a of the layer 418 are joined substantially flush and are longer than the upper 417 by at least 10-15 mm.

The upper assembly 415 further comprises an insole 413, which is breathable or perforated at least at the perspiration region 12 of the sole 11.

The insole 413 comprises a portion 413' made of a material that is breathable, for example mesh fabric, fabric, leather, or perforated, and a first gasket 420 which is joined to the lower surface of the portion 413'.

The first gasket 420, in a manner similar to the preceding solutions, is conveniently made of a material that is impermeable to water in the liquid state, while it has a portion 414 which is breathable or perforated, since it is permeable to water vapor or perforated, at least at the perspiration region 12 of the sole 11.

The lower flap 416a of the lining 416 and the lower edge 418a of the impermeable layer 418 are joined substantially flush, folded and glued so as to form an impermeable seal, according to the construction known as AGO lasting, under the perimetric edge 420a of the first gasket 420 which is associated with the insole 413.

The operation for pulling over the lower flap 416a of the lining 416 and of the lower edge 418a of the impermeable layer 418 is conveniently performed with an instrument known as pulling over machine.

The adhesive bonding between the lower flap 416a of the lining 416 and the lower edge 418a of the layer 418 and the first gasket 420 occurs conveniently by using adhesive commonly used for pulling over, such as adhesive of the thermoplastic, polyurethane or neoprene type.

As an alternative, the operation for pulling over the lining can occur manually with the aid of adapted clamps.

The upper 417 is thus assembled externally to the lower edge 418a of the impermeable layer 418, with a second pulling over operation, again conveniently by using adhesive commonly used for pulling over.

Advantageously, before connection to the sole 11 occurs, a second gasket 421 is arranged below the lower edge 417a of the upper 417, the lower flap 416a and the lower edge 418a, and at least perimetrically with respect to the breathable or perforated region 414 of the first gasket 420, and is sealed in a waterproof manner at least to the lower edge 418a, which is longer than the upper 417 by at least 10-15 mm, and to the first gasket 420, so as to provide a sealing bridge between the lower edge 418a and the first gasket 420 for at least 5-6 mm.

The second gasket 421 is substantially similar to the ones used in the preceding embodiments and allows to achieve the same advantages.

In practice it has been found that the invention achieves the intended aim and objects.

In particular, the invention provides a shoe which simultaneously is capable of protecting the foot that wears it in case of immersion in a few centimeters of water and at the same time can be manufactured in a manner that is simpler and more economical than the cited shoes of the known type.

For example, the film or tape of thermoplastic hot-melt adhesive can also act and as an adhesive for the sole if it is subjected to reactivation with heat.

The upper and lower elements, used for the impermeable sealing of the shoe, are thin and reduce assembly thicknesses considerably.

Furthermore, these elements are extremely simple to apply (reactivation with heat and pressing).

Furthermore, the invention provides a shoe that is more breathable at least at part of the upper with respect to the cited known shoes, in particular at the part of the upper that is free from the impermeable layer, and free from the breathable and impermeable membrane that is typical of known shoes.

The elimination of the membrane from the upper portion of the upper in fact allows to increase further the perspiration of the shoe, since the water vapor that exits toward the outside environment encounters one less layer with respect to traditional shoes with an upper which comprises an impermeable and breathable membrane, maintaining in any case the impermeableness of the shoe to a height that is sufficient to not wet the foot even if one walks on a surface covered by a few centimeters of water.

The specific characteristics of the various embodiments can be combined together in such a manner as to obtain additional variations which are again part of the invention.

The invention thus conceived is susceptible of numerous modifications and variations, all of which are within the scope of the appended claims; all the details may further be replaced with other technically equivalent elements.

In practice, the components and materials used, so long as they are compatible with the specific use, as well as the contingent shapes and dimensions, may be any according to requirements and to the state of the art.

The disclosures in Italian Patent Application No. 102017000044532 from which this application claims priority are incorporated herein by reference.

The invention claimed is:
1. A shoe with an upper that is at least partially rendered impermeable, comprising:
a sole;
an insole;
a region providing a waterproof seal of said insole to said sole; and
an upper assembly, the upper assembly including:
a breathable lining,
a breathable upper, and
a layer that is waterproof and not permeable to vapor, wherein the layer is fixed hermetically below the insole, wherein said upper assembly is associated with said insole, and
wherein the layer is interposed between at least a part of the breathable lining and the breathable upper.
2. The shoe according to claim 1, wherein said sole has a perspiration region.
3. The shoe according to claim 1, wherein at least a lower surface of said insole is made of impermeable material.
4. The shoe according to claim 1, wherein said insole has at least one breathable or perforated portion above said perspiration region, said breathable or perforated portion covering said perspiration region when assembled, and said sealing region substantially surrounding said breathable or perforated portion which is free for perspiration.
5. The shoe according to claim 2, wherein said insole includes at least one first gasket of a waterproof material, the first gasket facing in a direction of the sole and provided with at least one breathable or perforated portion above the perspiration region of the sole,
wherein lower edges of the breathable upper and of the layer that is waterproof and not permeable to vapor are folded below the at least one first gasket.
6. The shoe according to claim 5, wherein there is at least one second gasket made of a waterproof material, which is arranged below the lower edges of the upper and of the layer that is waterproof and not permeable to vapor in order to affect, at least perimetrically, the perspiration region of the sole, and wherein the at least one second gasket is sealed in an impermeable manner at least to said first gasket.
7. The shoe according to claim 5, wherein said first gasket is composed of a multilayer film which comprises a layer of adhesive and of a layer of material that is waterproof.
8. The shoe according to claim 5, wherein said first gasket is made of multilayer film, comprises two layers of adhesive between which a layer of material that is waterproof is interposed.
9. The shoe according to claim 5, wherein the lower edge of the breathable upper and the lower edge of the layer that is waterproof and not permeable to vapor are joined, substantially flush, folded and glued so as to provide an impermeable seal, according to a working method known as AGO lasting, below a perimetric region of the first gasket.
10. The shoe according to claim 6, wherein said second gasket is made of a material that is impermeable to water in the liquid state, said second gasket surmounting and straddling the lower edge of the upper and of the first gasket, so as to be in direct contact both with the lower edge of the upper and with the first gasket.
11. The shoe according to claim 1, wherein said layer that is waterproof and not permeable to vapor is coupled to said lining.
12. The shoe according to claim 1, wherein said layer that is waterproof and not permeable to vapor is coupled to said upper.
13. The shoe according to claim 1, wherein said layer that is waterproof and not permeable to vapor is composed of a layer of polyurethane adhesive and a layer of material that is waterproof.
14. The shoe according to claim 1, wherein said layer that is waterproof and not permeable to vapor is extended between the upper and the lining so as to form a hand with a height of 20-60 mm.
15. The shoe according to claim 14, wherein said height is measured in a direction that is perpendicular to a resting plane of the shoe, between a lower surface of the insole and an upper end of the layer that is waterproof and not permeable to vapor.
16. The shoe according to claim 1, wherein the layer that is waterproof and not permeable to vapor is continuously formed from a first end positioned between the breathable lining and breathable upper of the upper assembly to a second end located and fixed hermetically below the insole.
17. A shoe with an upper that is at least partially rendered impermeable,
comprising: a sole; an insole;
an upper assembly, said upper assembly comprising a breathable lining, a breathable upper, and
a layer that is waterproof and not permeable to vapor, wherein the layer is fixed hermetically below the insole, wherein said upper assembly is associated with said insole, and wherein the layer is interposed between at least a part of the breathable lining and the breathable upper; and a region providing a waterproof seal of said insole to said sole, wherein said layer that is waterproof and not permeable to vapor is extended between the upper and the lining so as to form a band.

18. The shoe according to claim 17, wherein the band has a height of 20-60 mm.

19. A shoe with an upper that is that least partially rendered impermeable, comprising: a sole; an insole;

an upper assembly, said upper assembly including a breathable lining, a breathable upper, and a layer that is waterproof and not permeable to vapor; wherein the layer is fixed hermetically below the insole, wherein said upper assembly is associated with said insole, and wherein the layer is interposed between at least a part of the breathable lining and the breathable upper and a region providing a waterproof seal of said insole to said sole, wherein said layer that is waterproof and not permeable to vapor is composed of a layer of polyurethane adhesive and a layer of material that is waterproof.

\* \* \* \* \*